United States Patent
Anderson et al.

[11] 3,787,655
[45] Jan. 22, 1974

[54] METHOD OF UNDERWATER WELDING

[75] Inventors: Dale R. Anderson, Zachary, La.;
Conway E. Grubbs, Glenn Ellyn, Ill.

[73] Assignee: Chicago Bridge & Iron Company, Oak Brook, Ill.

[22] Filed: June 5, 1972

[21] Appl. No.: 259,544

[52] U.S. Cl..................... 219/72, 219/136, 219/137
[51] Int. Cl............................................. B23k 9/16
[58] Field of Search. 219/72, 74, 75, 130, 136, 137, 219/145, 146

[56] References Cited
UNITED STATES PATENTS

| | | | |
|---|---|---|---|
| 3,626,147 | 12/1971 | Sato | 219/74 |
| 2,552,176 | 5/1951 | Hummitzsch | 219/146 |
| 2,572,796 | 10/1951 | Woodard | 219/137 |
| 3,632,950 | 1/1972 | Berghof | 219/72 |
| 3,671,707 | 6/1972 | Cunningham | 219/74 |

*Primary Examiner*—J. V. Truhe
*Assistant Examiner*—George A. Montanye
*Attorney, Agent, or Firm*—Charles J. Merriam et al.

[57] ABSTRACT

Flux-coated electrodes pressure equalized to an underwater welding depth in contact with a fluid other than water before the electrodes are contacted with water at the welding site are used in wet welding.

Flux-coated electrodes are preconditioned by pressurizing them in a fluid other than water to a pressure substantially equal to an underwater pressure where the electrodes are to be used in wet welding.

At a location above sea level, placing a plurality of flux-coated welding electrodes in a water proof container containing a fluid other than water, delivering the container to an underwater welding site with the electrodes in the container substantially pressurized to the pressure at the welding site, and removing the electrodes from the container at the welding site and placing the electrodes in a storage chamber adjacent the welding site, said storage chamber containing a fluid, other than water, at a pressure substantially equal to the underwater pressure at the welding site.

An electrode pressure preconditioning container having walls capable of withstanding pressure equal to the pressure at an underwater welding site, a removable closure for closing an opening in the container, a conduit outside the container communicating with the container interior space, and a valve in the conduit.

8 Claims, 6 Drawing Figures

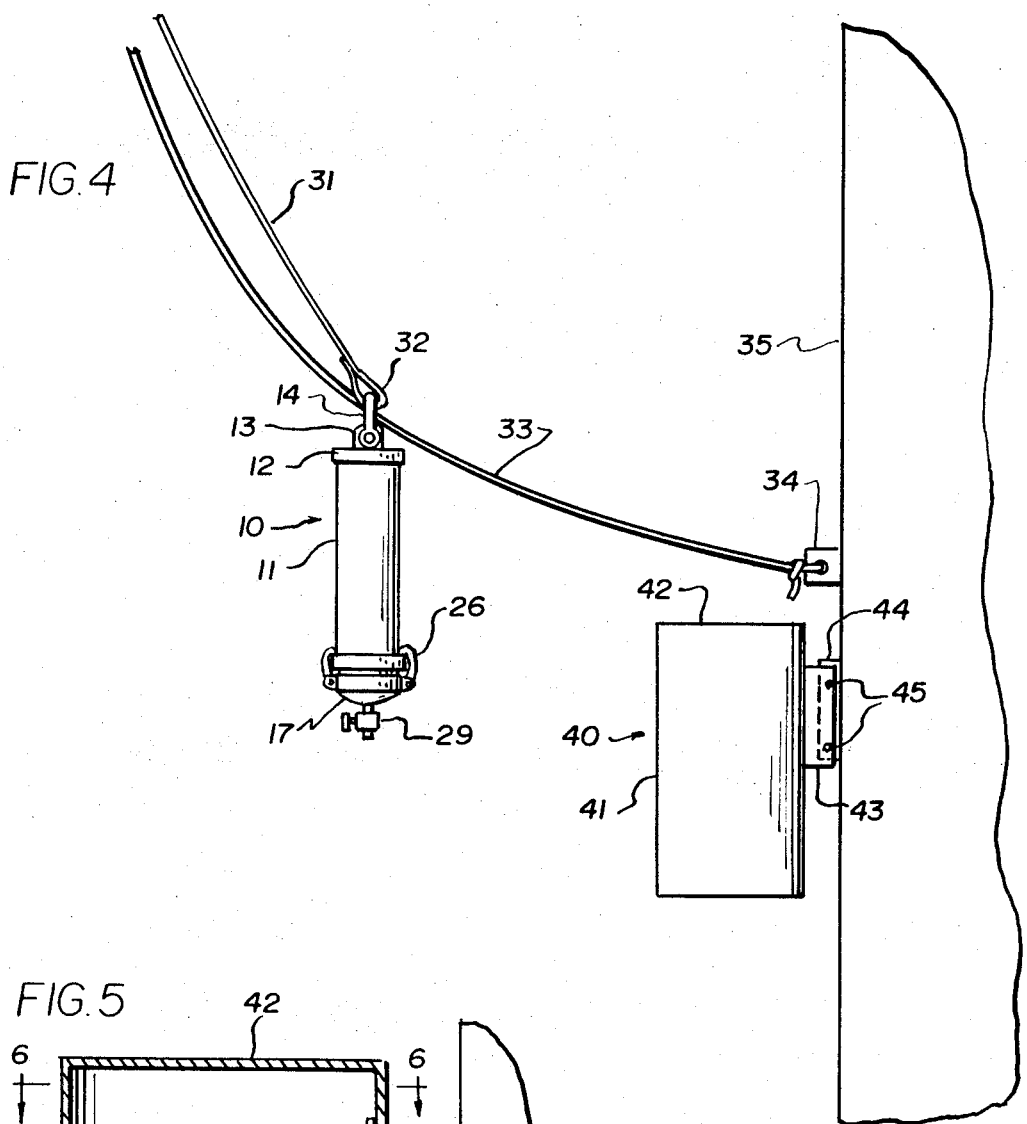
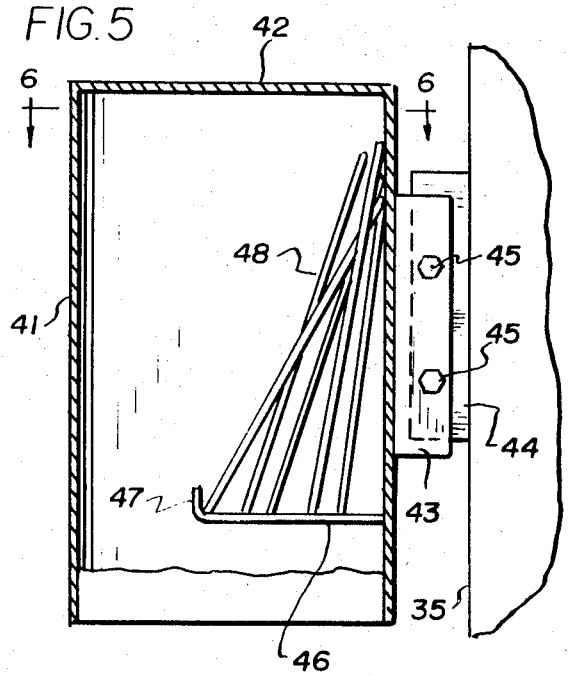
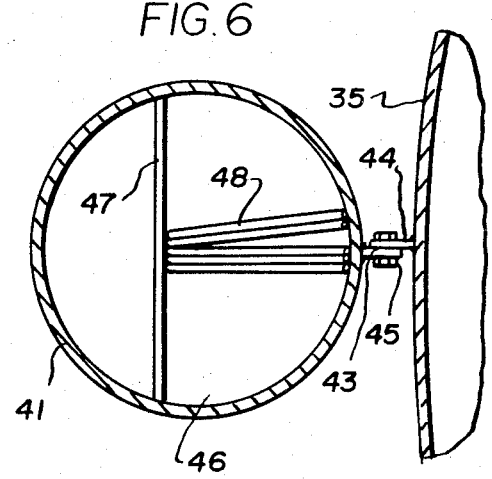

METHOD OF UNDERWATER WELDING

This invention relates to underwater welding. More particularly, this invention is concerned with methods and apparatus for handling flux-coated welding electrodes to produce underwater wet welds of improved quality.

The construction and repair of metal objects such as ships, piers, off-shore well-drilling rigs and oil-producing platforms, often requires that underwater welding be used to join together metal plates and other objects. The welds are often made by wet-welding in which the object being welded and the molten weld are in contact with the water.

The electrodes used in making electric arc wet welds underwater generally comprise a wire about 14 to 18 inches long covered with a flux. Voids and crevices are inherently produced in the flux manufacture. The voids and crevices are interconnected. This can be demonstrated by submerging an electrode in water and observing the bubbles of gas that escape from the flux. When a 14-inch long electrode is submerged vertically in water with the top end only 1 inch below the water surface, gas bubbles will escape from the top end of the flux for several minutes. The pressure differential of the gas in the voids and crevices in the flux versus the surrounding water pressure varies from only 0.56 psi at the bottom end of the electrode to virtually zero at the top where the bubbles find their way to the water surface.

Conventionally, flux-coated electrodes to be used in making underwater wet-welds are first prepared by dipping, spraying or otherwise coating them with a layer of waterproof material. Cellulose varnish is suitable for this purpose, although other coverings or coatings can be used. Unless a waterproof covering is applied to the electrodes, they are unsatisfactory for underwater welding. After the electrodes are covered with a waterproof material, they are taken to the underwater work area where they are used by the welder as welding proceeds. From the time the electrodes are brought underwater until they are consumed in welding, the electrodes are in contact with, and subject to the external pressure exerted by, the water. If the water depth and resulting pressure differential is great enough, the waterproof material covering the flux will be penetrated by the water either by puncturing the flux coating, without deforming the flux, or by crushing or squeezing the flux until the flux voids collapse.

Even if the water depth is not great enough to rupture the waterproof covering, the flux will become wet as soon as an arc is struck and then stopped. Striking of the arc underwater exposes the surface of the flux at the molten end of the electrode. The exposed surface provides easy access for the water to enter the flux when the electrode welding end is placed in contact with the water during a stop in welding. Water is sucked into the voids and crevices of the flux, to the extent that the voids and crevices are not already filled with water or collapsed, that are still filled with gas at one atmospheric pressure, which is less than the ambient water pressure.

One might theorize that the negative pressure differential in the flux voids would be equalized by gas moving into the flux voids from the bubble that surrounds the arc and weld puddle. This means of pressure equalization, however, would require that an underwater welder use each and every electrode without interruption from the time the arc is struck and the waterproof coating on the tip of the electrode is ruptured until it is totally consumed. By continuously welding until the electrode is consumed, the electrode end could possibly be surrounded by gas rather than water and the pressure thereby equalized. However, this does not happen in practice.

The wetting of a flux-coated electrode having a waterproof covering on the flux surface can take from a few minutes to several hours in shallow water less than 30 1feet deep. At greater depths the flux wetting can occur even before the electrodes reach the working depth. As the water depth increases, the problem of keeping the electrode flux dry becomes more severe. This is due to the increased pressure differential between the atmospheric pressure of the gas in the flux voids and crevices and the surrounding water pressure. For example, at a depth of 165 feet in sea water (6 atmospheres or 88.2 psi), the pressure differential from atmospheric pressure is 73.5 psi.

There is accordingly a need for apparatus and methods for providing flux-coated welding electrodes at a welding site with the flux preconditioned against wetting by water so that wet welds can be made satisfactorily.

According to one aspect of the invention, there is provided a method of preconditioning a welding electrode which comprises pressurizing a flux-coated electrode in a fluid other than water to a pressure substantially equal to an underwater pressure where the electrode is to be used in wet welding. The fluid enters the voids and crevices in the flux and prevents entry of water by eliminating a differential pressure between the fluid in the electrode flux-coating and the water at the welding site.

The fluid used to pressurize the electrode flux can be a gas such as air, nitrogen, helium, carbon dioxide or a mixture of gases. When a gas is used it is advisable to employ a non-inflammable gas for safety reasons. Furthermore, when a gas is used, the electrodes should have a conventional waterproof covering or coating on the flux. The fluid can also be a liquid such as deoxaluminite, glyptol and carbon tetrachloride, and solutions of sodium silicate or potassium silicate in water. When a liquid is used, it is not necessary that the flux have a waterproof coating, particularly when the liquid is substantially immiscible or of low solubility in water.

According to another aspect of the invention, there is provided a method of preconditioning electrodes and delivering them to a welding site which comprises placing a plurality of flux-coated welding electrodes in a waterproof container containing a fluid other than water, delivering the container to an underwater welding site with the electrodes in the container substantially pressurized to the pressure at the welding site, and removing the electrodes from the container at the welding site ready for use in making wet welds. Furthermore, upon arrival at the welding site, the preconditioned electrodes can be placed in a storage chamber adjacent the welding site, said storage chamber containing a fluid, other than water, at a pressure substantially equal to the underwater pressure at the welding site. The method is particularly useful when a gas is employed as the fluid in the container and in the storage chamber, although the fluid can be a liquid as already described.

When a container is employed that is flexible, such as a plastic bag, the surrounding water pressure pressurizes fluid inside of the container as it is lowered in the water. The resulting increased fluid pressure causes the fluid to enter the flux and be pressurized to the pressure at the welding site where the container is opened.

The container used for preconditioning and delivering the electrodes to a welding site can also constitute a pressure vessel which is not altered in shape or size by the water pressure to which it is subjected. A pressure-vessel type of container can be loaded with the electrodes and pressurized with a fluid therein to an internal pressure substantially equal to or slightly above the pressure at which the welding work is being conducted underwater. The container can thereafter be lowered to the welding site, opened and the electrodes removed from the container for use in welding.

When a pressure-vessel container is employed, it is also advantageous to position the electrodes in bundles inside of waterproof plastic bags placed in the container. This facilitates removal of the electrodes from the pressure vessel at the welding site, without the electrodes becoming wet, and their storage until used for wet welding. By using a bag the welder need not handle each electrode separately until he is ready to use the electrode for welding.

The pressurized welding electrodes are advisably stored at the welding site in a storage chamber containing a fluid, other than water, at a pressure substantially equal to the underwater pressure at the welding site. A particular type of storage chamber that may be used can comprise a vertically-positioned walled structure having a closed top and open bottom. Such a storage structure can be filled with a suitable fluid, either gas or liquid. Waste gas exhausted from the welder's breathing equipment can be used to fill the storage chamber with a gaseous atmosphere at the correct pressure. If a liquid heavier than water is used to fill the storage chamber, the walled structure can have a closed bottom and open top.

According to a further aspect of the invention, the preconditioned flux-coated electrode is used to make underwater wet welds by having the electrode in contact with the water during the welding process. The electrode can be used in making welds by the wet-weld process using conventional procedures for such underwater welds.

The invention will be described further in conjunction with the attached drawings in which:

FIG. 4 is an elevational view of rope means for delivering the container of FIG. 1 to a welding site at which a storage chamber for the electrodes is located;

FIG. 5 is an elevational view, partially in section, of the storage chamber shown in FIG. 4; and FIG. 6 is a sectional view taken along the line 6—6 of FIG. 5.

So far as is practical, the same elements or parts which appear in the different views of the drawings will be identified by the same numbers.

Figure 1:
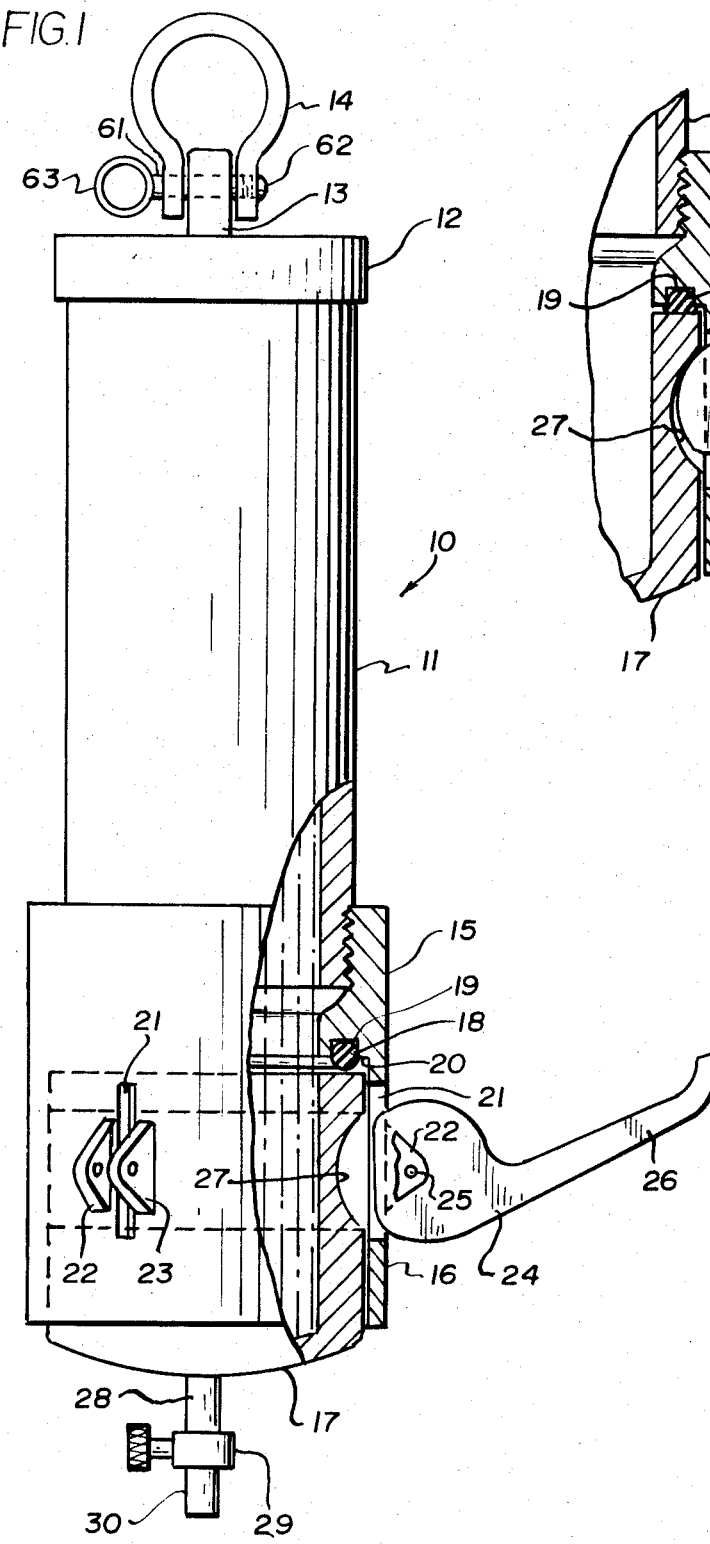
FIG. 1 is an elevational view, partially broken away and in section, showing an electrode transfer container.
Figure 2:
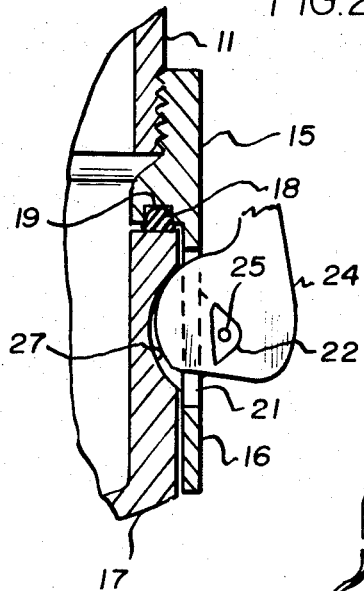
FIG. 2 is a partial sectional view of the container of FIG. 1 showing the cam lock in closed position.

With reference to FIGS. 1 and 2, container 10 is of the pressure-vessel type for preconditioning and delivering a plurality of flux-coated electrodes to an underwater welding site. Container 10 has a body portion 11 made from a stainless steel pipe about 4 inches in diameter and 16 inches long which is threaded at both ends. One end of pipe 11 is closed by cap 12 which has a lug 13 welded thereto. Shackle 14 is connected to lug 13 by bolt 61 which fits with clearance through a hole in lug 13. The end 62 of bolt 61 is threaded into a threaded hole in shackle 14. Ring 63 is joined to the other end of the bolt 61 so that the bolt can be turned readily in either direction by hand to remove the shackle from lug 13, or to replace it on the lug.

Collar 15 is threaded on to the other end of body 11. Collar 15 has an axially-extending cylindrical wall 16 into which plug or closure 17 fits with clearance for ready insertion and removal. O-ring 18 fits into a groove 19 located in radial shelf 20 on the inside of collar 15. A plurality of axially-positioned slots 21 are located in the cylindrical walled part 16 of collar 15. Normally from two to four slots are present and they are equally spaced from adjacent slots. Lugs 22 and 23 are located on each side of each of the slots 21. A cam lock 24 is mounted in between each of lugs 22 and 23 by pin 25. Arm 26 on each of the cam locks 24 is used to rotate the cam lock about pin 25. Plug 17 has an annular groove 27 in its outer surface into which each cam lock 24 swings with movement of arm 26. The cam locks 24 press against the surface of groove 27. The resulting pressure causes plug 17 to press securely against O-ring 18 to form a watertight seal. The seal so formed is released by rotating the arms 26 outwardly. When all of the cam locks 24 are rotated outwardly, plug 17 can be removed to open the container.

Pipe 28 communicates with the hollow interior of plug 17 and also with valve 29 to which nipple 30 is connected.

The container of FIGS. 1 and 2 is employed to precondition electrodes for underwater wet welding by first placing the flux-coated electrodes in the container, placing plug 17 in sealing position and then pressurizing the interior of the container by means of a fluid fed through conduit 30, valve 29 and conduit 28 to the interior of the container. After the desired internal pressure in container 10 has been reached, valve 29 is closed. The pressure inside of the container is advisably made slightly in excess of the ambient water pressure at the site where the electrodes are to be used underwater.

As shown in FIG. 4, the pressurized container 10 containing the welding electrodes is lowered to the welding site by means of a rope 31 which is attached to shackle 14 by loop 32. Guide rope 33 is attached at its lower end to tab 34 joined to plate 35 or some other structure at the welding site. Rope 33 is threaded through shackle 14 and extends above water to a boat or to land. Rope 33 functions to guide the container directly to the vicinity of the welding site.

After container 10 has been lowered to the welding site, the welder can open valve 29 to let excess fluid out of container 10 to equalize the pressure in the container with the surrounding water. Container 10 can then be inverted so that plug 17 is uppermost. Handles 26 of the cam locks 24 are then rotated outwardly until plug 17 is released. Following removal of plug 17, the electrodes are removed from container 10 and placed in storage chamber 40 as shown in FIGS. 4 to 6.

Storage chamber 40 has a vertical circular cylindrical wall 41 and a top 42. Vertical flange 43 is attached to the rear side of storage chamber 40, and it is attached to flange 44 on plate 35 by means of bolts 45. Shelf 46 is located inside of storage chamber 40 ans is used to hold the electrodes removed from container 10. Shelf 46 has an upright front edge 47 to keep the electrodes from sliding off of the shelf and falling to the sea floor.

The electrodes 48 which are supported by shelf 46 are surrounded by a fluid, other than water, which is inherently at a pressure equal to the pressure of the surrounding water. This serves to keep the electrodes under pressure and thereby preserves the pressure preconditioning to which they were previously subjected. The fluid in storage chamber 40 is normally a gas, but it can be a liquid having a specific gravity lower than the surrounding water. The exhaust gas from the welder's breathing equipment can be directed into storage chamber 40 to keep it filled with a gas. If the welder uses a closed-circuit breathing system, an auxiliary gas supply can be used to fill the storage chamber 40.

When a welder is engaged in depositing a weld, he removes some electrodes 48 as needed from storage chamber 40. He will normally remove only a quantity of electrodes as he can use in a short period of time in order that the electrode contact time with water will be minimal. However, because of the described preconditioning by equalization of the pressure on the flux, wetting of the flux by the water is much slower than in the case where there is no such preconditioning of the electrodes, even when the electrode surface is coated with a waterproof covering. The preconditioned electrodes, in which the pressure has been equalized in the flux to the working depth in water, are kept dry and there is very little tendency for the electrode flux to become wet during the short time the electrodes are in contact with the water during the welding process.

Figure 3:
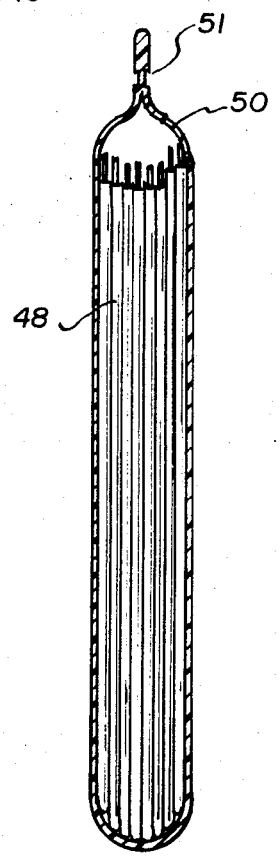
FIG. 3 is an elevational view of a package having a bundle of welding electrodes in a plastic bag.

FIG. 3 illustrates a group of waterproof-covered electrodes 48 placed in a waterproof plastic bag 50 which is sealed at the top by a heat seal 51. Plastic bag 50 can be made of heavy-gauge polyethylene film. Although any number of electrodes can be placed in such a bag, it is advisable to include only about 20 to 30 electrodes per bag so that they can be handled with relative ease both on shore as well as at the underwater welding site.

A package of electrodes such as described with reference to FIG. 3 can be prepared above water and then lowered to the welding site in the same manner as described with reference to FIG. 4. As the package of electrodes in the plastic bag is lowered into the water, the sea pressure forces the gas, or liquid, in the bag to a higher pressure and thereby automatically equalizes the internal pressure with the surrounding water pressure. After the package of electrodes has reached the welding site, it can be opened and the electrodes used immediately for welding. Alternatively, one or more such packages of electrodes can be placed opened or unopened in storage chamber 40 until the electrodes are to be used.

The electrode package of FIG. 3 can also be used in conjunction with the preconditioning container 10 described with reference to FIGS. 1 and 2. One or more electrode packages such as shown in FIG. 3 can be placed in container 10 above the water surface, after which plug 17 can be sealed in place and the container subsequently pressurized by feeding a suitable fluid into the container by means of conduit 30. The container 10 can thereafter be lowered to the welding site and opened. The electrode packages can then be removed from container 10 and placed in storage chamber 40 until they are used. Of course, it is not necessary that the electrode packages be placed in chamber 40 because the bags 50 are waterproof and prevent the flux from being placed in contact with the water.

Although a large number of liquids and gases can be used to precondition the electrodes, care should be taken to use a fluid which has a beneficial effect, or at least no deleterious effect, on weld metal chemistry and general weldability of the electrode. Furthermore, when a liquid is used, the absence of a waterproof coating on the flux often facilitates penetration of the liquid into the flux. In addition, a water immiscible liquid used for the preconditioning can often also provide a waterproof covering or film on the flux surface to retard wetting of the flux and thereby make unnecessary the application of a separate waterproof coating on the flux before pressure preconditioning.

The foregoing detailed description has been given for clearness of understanding only, and no unnecessary limitations should be understood therefrom, as modifications will be obvious to those skilled in the art.

We claim:

1. The method of welding underwater which comprises:
   placing a flux-coated electrode in a fluid other than water,
   subjecting the fluid to a pressure substantially equal to the water pressure at a depth where welding is to take place to thereby fill the voids in the flux with the fluid,
   removing the electrode from the pressurized fluid while the fluid is pressurized to the water pressure at the welding site and placing the electrode, while so pressurized, in contact with the water at the welding site, and
   making a weld with the electrode in contact with the water.

2. The method of claim 1 in which the fluid is a gas.

3. The method of claim 1 in which the flux has a waterproof covering.

4. The method of claim 2 in which the gas is air.

5. The method of claim 1 in which the electrode is held at the welding site in a storage chamber containing a fluid other than water before being used for welding.

6. The method of claim 5 in which the fluid is a gas.

7. The method of claim 6 in which the gas is air.

8. The method of claim 1 in which the fluid is a liquid substantially immiscible with water.

* * * * *